Figure 1:
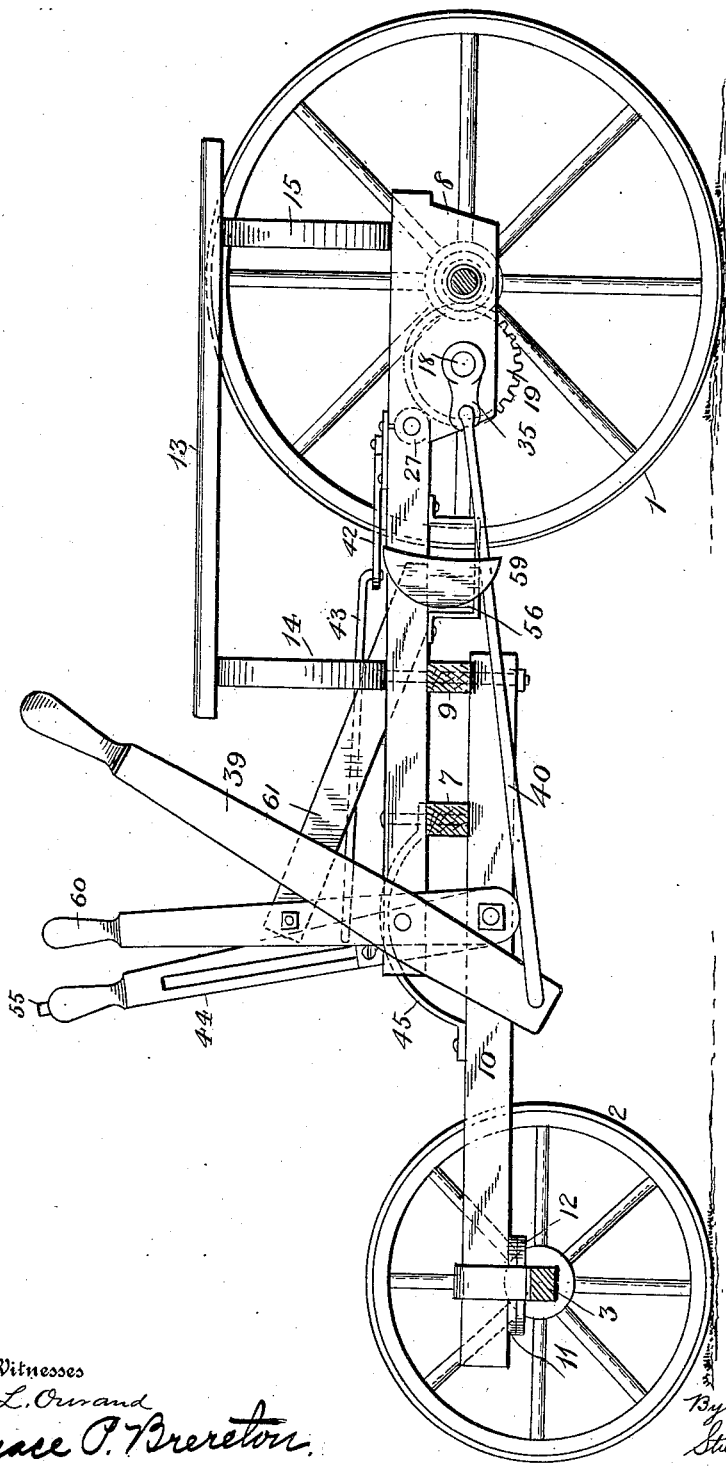

No. 891,872. PATENTED JUNE 30, 1908.
C. A. SMITH.
VEHICLE.
APPLICATION FILED FEB. 2, 1907.

4 SHEETS—SHEET 1.

Witnesses
F. L. Onward
Grace P. Brereton.

Inventor
Charles A. Smith

By
Sturtevant and Mason
Attorneys

No. 891,872.

C. A. SMITH.
VEHICLE.
APPLICATION FILED FEB. 2, 1907.

PATENTED JUNE 30, 1908.

4 SHEETS—SHEET 2.

Fig. 2.

Witnesses
F. L. Ourand
Grace P. Brereton

Inventor
Charles A. Smith

By
Sturtevant and Mason
Attorneys

No. 891,872.

PATENTED JUNE 30, 1908.

C. A. SMITH.
VEHICLE.
APPLICATION FILED FEB. 2, 1907.

4 SHEETS—SHEET 3.

Witnesses
Mary W. Hammer,
Grace P. Brereton.

Inventor
Charles A. Smith

By
Sturtevant and Mason.
Attorney

No. 891,872.
C. A. SMITH.
VEHICLE.
APPLICATION FILED FEB. 2, 1907.
PATENTED JUNE 30, 1908.
4 SHEETS—SHEET 4.
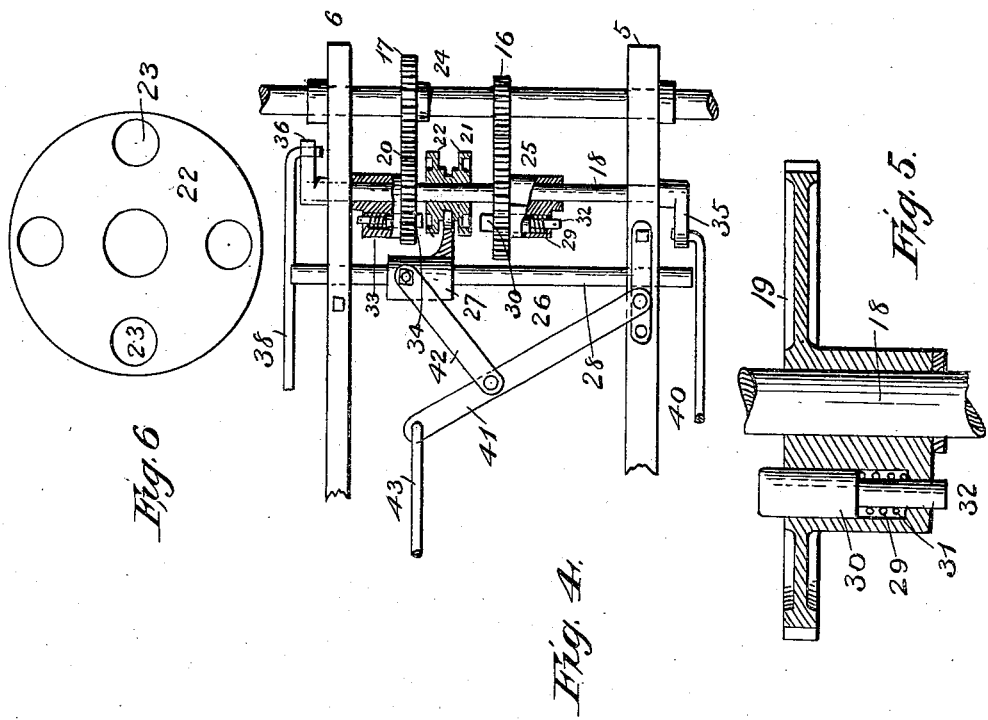
Witnesses
J. L. Orward
Grace P. Brereton
Inventor
Charles A. Smith
By
Sturtevant & Mason
Attorneys

UNITED STATES PATENT OFFICE.

CHARLES A. SMITH, OF BRATTLEBORO, VERMONT, ASSIGNOR TO NATIONAL NOVELTY CORPORATION, OF NEW YORK, N. Y., A CORPORATION OF NEW JERSEY.

VEHICLE.

No. 891,872.　　　　　Specification of Letters Patent.　　　Patented June 30, 1908.

Application filed February 2, 1907. Serial No. 355,402.

*To all whom it may concern:*

Be it known that I, CHARLES A. SMITH, a citizen of the United States, residing at Brattleboro, in the county of Windham, State of Vermont, have invented certain new and useful Improvements in Vehicles, of which the following is a description, reference being had to the accompanying drawing, and to the letters and figures of reference marked thereon.

My invention relates to new and useful improvements in vehicles and has for its object to provide a driving mechanism which shall be simple in construction and easily operated so that the vehicle may be propelled at a high speed or at a low speed or be allowed to run free.

A further object of my invention is to provide an improved form of clutch which will immediately be engaged upon being shifted and thus avoid waiting for the clutch to come into proper position for engagement.

A further object of my invention is to provide a driving mechanism which includes an intermediate shaft having gears or sprockets loosely mounted thereon and a clutch splined to said intermediate shaft which may be engaged with either of said gears or sprockets.

A still further object of my invention is to provide a simple means for operating the clutch which shall be accessible to the rider and also be provided with means for retaining said clutch in engagement with either of the driving gears and in position intermediate the same and free therefrom.

My invention consists in the novel combination, arrangement and parts hereinafter described and shown in the drawings.

Figure 3:
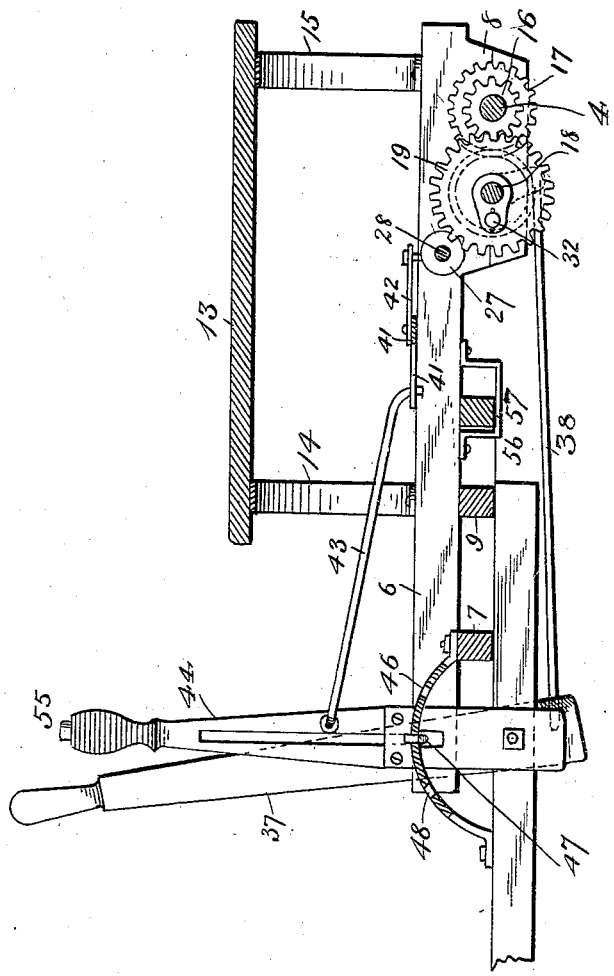

In the accompanying drawings which show one embodiment of my invention, Figure 1 is a side elevation of a vehicle having my improvements applied thereto, the rear wheels being removed and the axles shown in section. Fig. 2 is a top plan view of a vehicle embodying my invention, the seat being broken away to expose the driving mechanism. Fig. 3 is a sectional detail view showing the clutch shifting lever and the means for holding the same in predetermined positions. Fig. 4 is a sectional plan view showing the clutching mechanism and driving gears. Fig. 5 is a sectional view of one of the gears showing the clutch engaging pin. Fig. 6 is a side view of the clutch member showing the recesses for the reception of the clutch pin. Fig. 7 is a sectional view of the lever for shifting the clutch, and illustrating also the brake applying lever.

The vehicle is provided with the usual running wheels 1, 1, and 2, 2. The forward wheels 2, 2 are mounted on an axle 3 and the rear wheels 1, 1 are mounted on an axle 4. The framework which connects the front and rear axles and supports the driving mechanism and seat of my improved vehicle comprises side members 5 and 6 which are connected at their forward end by a cross brace 7. The side pieces 5 and 6 have bolted thereto at the under side and at their rear ends box carrying members 8, 8. These members 8, 8 are made in two parts and the bearings for the rear axle are clamped between said members. At a short distance forward of the center of the side members 5 and 6 is a second cross brace 9. The frame is connected to the forward axle by a centrally located reach 10. Said reach is bolted or otherwise suitably secured to the cross braces 7 and 9. At the forward end the said reach is pivoted to the central portion of the forward axle. In order to form a durable pivotal support, I have provided the lower side of said reach with a circular plate 11, which is rigidly secured thereto and a similar plate 12 is carried by the axle. Said two plates have their faces in contact and serve to form a durable pivotal support.

The seat 13 for the rider is carried by bowed steel springs 14 and 15. The spring 14 has its free ends secured to the side pieces 5 and 6 and extends outwardly and upwardly and entirely across underneath the seat. The spring 15 is of similar construction and is secured to the members 5 and 6 near their rear ends.

The running wheels 1, 1 are rigidly secured to the axle or supporting shaft 4. Said shaft 4 is provided intermediate its ends with gear wheels 16 and 17 rigidly secured to said axle. Said gear wheel 16 is of less diameter than the gear wheel 17. An intermediate driving shaft 18 is located slightly in front of the axle or shaft 4 and is carried by suitable bearings supported by the members 8, 8. Said shaft 18 is provided with gears 19 and 20 which are suitably proportioned and spaced so as to engage the gears 16 and 17 respectively. Said gears 19 and 20 are mounted so as to normally run free upon the shaft 18, but are secured from lateral movement thereon. Intermediate the gears 19 and 20, is a clutch member 21 that is feathered on the shaft 18. Said clutch member as shown in Fig. 4 comprises two disks 22, 22 each of which is provided with recesses 23, 23 spaced approximately at 90 degrees apart. Said disks 22, 22 are rigidly connected by an intermediate collar 24. Said collar 24 is provided with an annular groove in which rests a fork 26 carried by a collar 27 mounted on a rod 28 which extends transversely of the frame of the vehicle, and is supported by the side members 5 and 6. Said rod 28 is supported by said members so as to be free to move longitudinally.

The gear 19 as shown in Fig. 5 is provided with a sleeve 29 in which fits a clutch pin 30. Said clutch pin 30 is normally pressed outward by a coil spring 31 which surrounds a reduced portion of the shank of said clutch pin and bears against said clutch pin at one end, while at its other end said spring bears against a seat in the sleeve 29. The outward movement of said clutch pin is limited by a cotter pin 32. The gear 20 is provided with a similar collar 33 and clutch pin 34.

The gears 19 and 20 are so spaced that when the pins 30 and 34 are normally in their extreme outer positions and the clutch member 21 is located centrally between said gears 19 and 20 the clutch pins are free from said clutch member and therefore, the gears 19 and 20 will run free upon the shaft 18.

The shaft 18 at its outer ends is provided with suitable cranks 35 and 36 which are angularly spaced upon said shaft. At the forward end of the side piece 6 is pivoted a hand lever 37. Said lever 37 projects downward below its pivotal connection and has its lower end connected to a link 38. The opposite end of said link 38 is connected to the crank 35. Pivotally secured to the side piece 5 is a similar hand lever 39 which is connected by means of a link 40 to the crank 36.

The rod 28 which shifts the clutch member 21 is moved longitudinally in its bearings by means of a lever 41. Said lever 41 intermediate its ends is connected by a link 42 to the collar 27. Said lever 41 at its outer end is connected by a link 43 to a hand lever 44 as shown in Figs. 1 and 2. Said lever 44 as more clearly shown in Fig. 7, is pivoted to the center reach 10 at its lower end, while the link 43 is connected to said lever at a short distance above said pivotal connection. Connected to said reach at one end and to the cross brace 7 at the other end, is a locking segment 45 for holding the lever 44 in predetermined positions. Said member 45 is bent in the arc of a circle the center of which coincides with the pivotal support for the lever 44. This locking segment 45 is provided with three openings 46, 47, and 48. The lever 44 is slotted as at 49 intermediate its ends. The handle portion of said lever is bored longitudinally as at 50, and said bore connects with the slot 49. Located within the slot 49 and extending up through the bore 50 is a rod 51. Said rod 51 at its lower end is bent outward and then upward forming an upwardly extending projection 52, which is so disposed relative to the locking segment 45 that said projection will enter one of the holes 46, 47 or 48. This rod 51 is retained in its extreme upper position and with its projection in engagement with one of said holes by means of a spring 53 which encircles the upper portion of said rod and at one end bears against the shoulder 54 in said handle, while at its other end said spring bears against a thumb piece 55 screwed on to the end of said rod.

The side members 5 and 6 are each provided with a U shaped bracket 56 which is secured to the under side of said pieces. Within said brackets is mounted a brake beam 57, which carries on its outer ends brake shoes 58 and 59. Said brake beam is operated by a lever 60 which is mounted on the same pivotal support as the lever 44 as shown in Fig. 7. Said lever 60 is connected to the brake beam by means of a link 61 which is pivoted to said lever 60 intermediate its ends. The operation of my brake mechanism will be obvious.

When it is desired to operate the brake, the rider pulls upon the lever 60 which through the link 61 slides the brake beam within the brackets 56 and brings the brake shoes 58 and 59 into contact with the rear running wheels.

The operation of my device is thought to be obvious from the above description. The rider sits upon the seat 13 and places his feet upon the foot rests 62 and 63, carried by the front axle. Said foot rests are formed by a metal strip having up-turned ends 64 and 65 and at its central portion said strip extends up over the reach 10 and serves to strengthen and support the pivotal connection of the reach 10 with the forward axle. The vehicle is guided by means of the feet resting upon the front axle. It will be obvious however, that in certain aspects of my invention any other means may be provided for guiding the vehicle. When it is desired to operate the vehicle at low speed the clutch lever 44 is thrown rearward until the projection 52 engages the hole 46. In this position the clutch member 21 is brought into engagement with the clutch pin 34 of gear 20, thus connecting the gear 20 to the driving shaft 18. The rider then operates the levers 37 and 39 which in turn rotate the shaft 18 and through the shaft 18 the gear 20 and the gear 17 turn the running wheels. When it is desired to operate the vehicle at high speed, the finger piece 55 is depressed, thus lowering the projection 52 from the retaining clip and the lever 44 is moved to its extreme forward position and the projection 52 brought into engagement with the hole 48 in the locking segment. When in this position the clutch member 21 is brought into engagement with the clutch pin 30 and the gear 19 is rigidly connected with the driving shaft 18.

When it is desired to coast or to allow the vehicle to run free of all driving connection, the lever 44 is brought into intermediate position with the projection 52 in engagement with the hole 47 in the locking segment. In this position of the lever 44, the clutch member 21 is held centrally positioned between the gears 19 and 20 and entirely out of engagement therewith. The gears 19 and 20 will then run free upon the driving shaft.

It will be obvious that instead of using gears which are directly connected sprocket wheels having sprocket chains connecting the same may be substituted therefor. It will also be obvious that the loose running gears may be mounted on the driving shaft or axle, while the driving gears are pinned or splined to the driving shaft. In this case, of course, the clutching member will be necessarily mounted on the driven shaft or axle.

By using a spring pressed clutch pin, it will be seen that as soon as the lever 44 is shifted the clutch member 21 is brought into frictional engagement with the clutch pin and unless the vehicle is under heavy load, said frictional engagement will be sufficient to cause a driving connection between the parts. Under heavy load however, the clutch pin will slide upon the clutch until brought into register with one of the recesses 23 when driving connection will be made. It will also be obvious that a crank shaft may be placed near the center of the vehicle and provided with pedals for operating the driving shaft in place of the hand levers which I have shown. It will also be obvious that other means than the cranks herein shown may be substituted for the purpose of turning the driving shaft.

It will be noted that I have provided a vehicle with an operating means which is symmetrically arranged relative to the vehicle and that said operating means is readily accessible to the rider or operator of said vehicle.
It will be obvious that minor changes in the detail of construction herein described may be made without departing from the spirit of my invention.

Having thus particularly described my in-
vention, what I claim as new and desire to secure by Letters Patent is:—

1. In a child's cart, front and rear axles, supporting wheels thereon, a frame connecting the axles, a seat on the frame, an intermediate shaft journaled in the frame in advance of the rear axle, a gear and pinion fixed on the rear axle, a pinion and gear loose on the intermediate shaft and intermeshing with the gear and pinion, a clutch for connecting the intermediate shaft to either the gear or pinion, a rod mounted in the frame and extending parallel with the shaft, a clutch operating collar on said rod, an operating lever in front of the seat, means for connecting the collar to the lever and means in front of the seat for driving the intermediate shaft.

2. In a child's cart, front and rear axles supporting wheels thereon, a frame connecting the axles, a seat on said frame, an intermediate shaft journaled in the frame in advance of the rear axle, a gear and pinion fixed on the rear axle, a pinion and gear loose on the intermediate shaft and intermeshing with the gear and pinion, a double clutch member slidable on the shaft to engage either the loose pinion or gear, a slidable clutch operating collar, a rod arranged in advance of the shaft carrying said collar, a horizontally swinging lever mounted on the frame, a link connecting said lever to the collar, and a manually operable lever disposed in advance of the seat and connected to said horizontally swinging lever.

3. In a child's cart, front and rear axles, supporting wheels thereon, a frame connecting the axles, a seat on said frame, a gear and pinion on the rear axle, an intermediate shaft journaled in advance of the rear axle, a pinion and gear on the shaft and intermeshing with the gears of the axle, a clutching mechanism for rendering either set of gears operative, a rod extending transversely of the frame and parallel with the shaft, a collar on said rod, a clutch operating member carried by the collar, a collar actuating means located in advance of the seat, end cranks on the shafts, a pair of manually operated levers pivoted to the frame in advance of the seat, and connecting rods extending between 100 the levers and cranks.

In testimony whereof I affix my signature, in presence of two witnesses.

CHAS. A. SMITH.

Witnesses:
L. G. TASKER,
F. C. ADAMS.